US011384959B2

(12) United States Patent
Piacenti et al.

(10) Patent No.: US 11,384,959 B2
(45) Date of Patent: Jul. 12, 2022

(54) JOINT FOR HIGH TEMPERATURE FLUID

(71) Applicant: Meccanotecnica Umbra S.p.A., Campello sul Clitunno (IT)

(72) Inventors: Paolo Piacenti, Campello sul Clitunno (IT); Fabrizio Ragni, Campello sul Clitunno (IT); Massimiliano Borasso, Campello sul Clitunno (IT)

(73) Assignee: Meccanotecnica Umbra S.p.A., Campello sul Clitunno (IT)

( * ) Notice: Subject to any disclaimer, the term of this patent is extended or adjusted under 35 U.S.C. 154(b) by 0 days.

(21) Appl. No.: 16/768,162

(22) PCT Filed: Oct. 15, 2018

(86) PCT No.: PCT/IB2018/057974
§ 371 (c)(1),
(2) Date: May 29, 2020

(87) PCT Pub. No.: WO2019/106450
PCT Pub. Date: Jun. 6, 2019

(65) Prior Publication Data
US 2020/0370790 A1    Nov. 26, 2020

(30) Foreign Application Priority Data

Dec. 1, 2017   (IT) .................. 102017000138814

(51) Int. Cl.
*F24S 80/30*   (2018.01)
*F24S 23/71*   (2018.01)
*F24S 25/12*   (2018.01)
*F16L 27/08*   (2006.01)

(52) U.S. Cl.
CPC .......... *F24S 80/30* (2018.05); *F16L 27/0828* (2013.01); *F24S 23/71* (2018.05); *F24S 25/12* (2018.05)

(58) Field of Classification Search
CPC ..... F16L 27/0828; F24S 80/30; F24S 30/425; F24S 30/42
See application file for complete search history.

(56) References Cited

U.S. PATENT DOCUMENTS 2,549,951 A * 4/1951 Warren ............... F16L 27/0828
285/94
3,837,380 A    9/1974 Davies
(Continued)

FOREIGN PATENT DOCUMENTS

BE           792069 A      3/1973
CN        107143707 A      9/2017
(Continued)

OTHER PUBLICATIONS

International Search Report for International Patent Application No. PCT/IB2018/057974, dated Apr. 16, 2019, 6 pages.
(Continued)

*Primary Examiner* — Jorge A Pereiro
(74) *Attorney, Agent, or Firm* — Armstrong Teasdale LLP

(57) ABSTRACT

A joint for systems for transporting a high temperature heat-transfer fluid is provided. The joint includes a fixed conduit, a first sealing ring joined to the fixed conduit, a rotatable conduit in abutment with the sealing ring, and an outer casing delimiting a chamber. A contact region between the rotatable conduit and the first sealing ring is arranged in the chamber. The outer casing is sealingly engaged with the rotatable conduit by a second sealing ring and with the fixed conduit.

6 Claims, 4 Drawing Sheets

(56) References Cited

U.S. PATENT DOCUMENTS

| | | | | |
|---|---|---|---|---|
| 5,050,913 | A | * | 9/1991 | Lenz ................... F16L 27/0816 |
| | | | | 285/332.1 |
| 9,631,839 | B2 | * | 4/2017 | O'Rourke ............... F24S 80/20 |
| 2010/0051018 | A1 | * | 3/2010 | Ammar ................... F24S 23/79 |
| | | | | 126/684 |
| 2010/0205963 | A1 | * | 8/2010 | Ammar ................... F24S 80/30 |
| | | | | 60/641.15 |
| 2011/0126378 | A1 | * | 6/2011 | Ota ........................ B08B 5/02 |
| | | | | 15/405 |
| 2011/0291405 | A1 | * | 12/2011 | Burger .................... F24S 80/30 |
| | | | | 285/114 |
| 2012/0187675 | A1 | | 7/2012 | Tausch |
| 2017/0219144 | A1 | * | 8/2017 | Petrou .................. B23Q 11/103 |

FOREIGN PATENT DOCUMENTS

| | | | | |
|---|---|---|---|---|
| CN | 107191715 | A | | 9/2017 |
| DE | 1201135 | B | | 9/1965 |
| DE | 19613032 | C1 | | 6/1997 |
| GB | 838940 | A | * | 6/1960 ........ F16L 27/0828 |
| GB | 1189014 | A | * | 4/1970 ........ F16L 27/0832 |
| WO | 2017168361 | A1 | | 10/2017 |

OTHER PUBLICATIONS

International Preliminary Report on Patentability for International Patent Application No. PCT/IB2018/057974, dated Apr. 1, 2020, 14 pages.

* cited by examiner

JOINT FOR HIGH TEMPERATURE FLUID

CROSS-REFERENCE TO RELATED APPLICATIONS

This application is a National Phase filing of PCT International Application No. PCT/IB2018/057974, having an International Filing Date of Oct. 15, 2018, claiming priority to Italian Patent Application No. 102017000138814, having a filing date of Dec. 1, 2017, each of which is hereby incorporated by reference in its entirety.

FIELD OF THE INVENTION

The object of the present invention is a joint for high temperature fluids, which is usable, for example, in concentrator systems for the conversion of solar energy.

BACKGROUND OF THE INVENTION

Such types of systems consist of a large number of modules, in jargon called "loops", installed over a fairly large area. For example, a medium-small concentrator system, capable of providing 50 MW of power, typically covers an area of 10 hectares and has 150 loops.

Each module comprises a plurality of parabolic mirrors and a local circuit for the heat-transfer fluid, connected at the inlet with a forward branch of a distribution network and at the outlet with a return branch of said network.

In order to maximize the thermal effect of solar energy, the main section of the local circuit is positioned at the focus of the parabolic surfaces and the mirrors of each module are rotatable to track the apparent trajectory of the sun.

The heat-transfer fluid may thus reach temperatures up to 400° C., ensuring optimum system performance.

However, at such temperatures, the diathermic oil passes into the vapor phase, causing unavoidable leakages at the connection points of the local circuit (subject to the tracking rotation) with the forward branch and with the return branch of the distribution network (which are instead fixed).

In such connection points, it is therefore necessary to provide special joints capable of ensuring, even at high temperature, the vapor-tightness between a rotating conduit, i.e. the incoming terminal section or the outgoing terminal section of the local circuit, and a fixed conduit, i.e. respectively the forward section of the distribution network or the return section of the latter.

It has been found that the joints currently used do not meet such requirement. On the contrary, such joints usually allow a quantity of vapor to escape, with considerable environmental damage (diathermic oil is highly polluting), system inefficiencies and high maintenance costs.

SUMMARY OF THE INVENTION

The object of the present invention is to provide a joint able to satisfy the requirements mentioned above.

Such object is achieved by a joint as described and claimed herein. Advantageous embodiments of the invention are also described.

BRIEF DESCRIPTION OF THE DRAWINGS

The features and advantages of the joint according to the present invention will be apparent from the description given below, provided by way of non-limiting example, in accordance with the accompanying figures, wherein.

DETAILED DESCRIPTION

Figure 1:
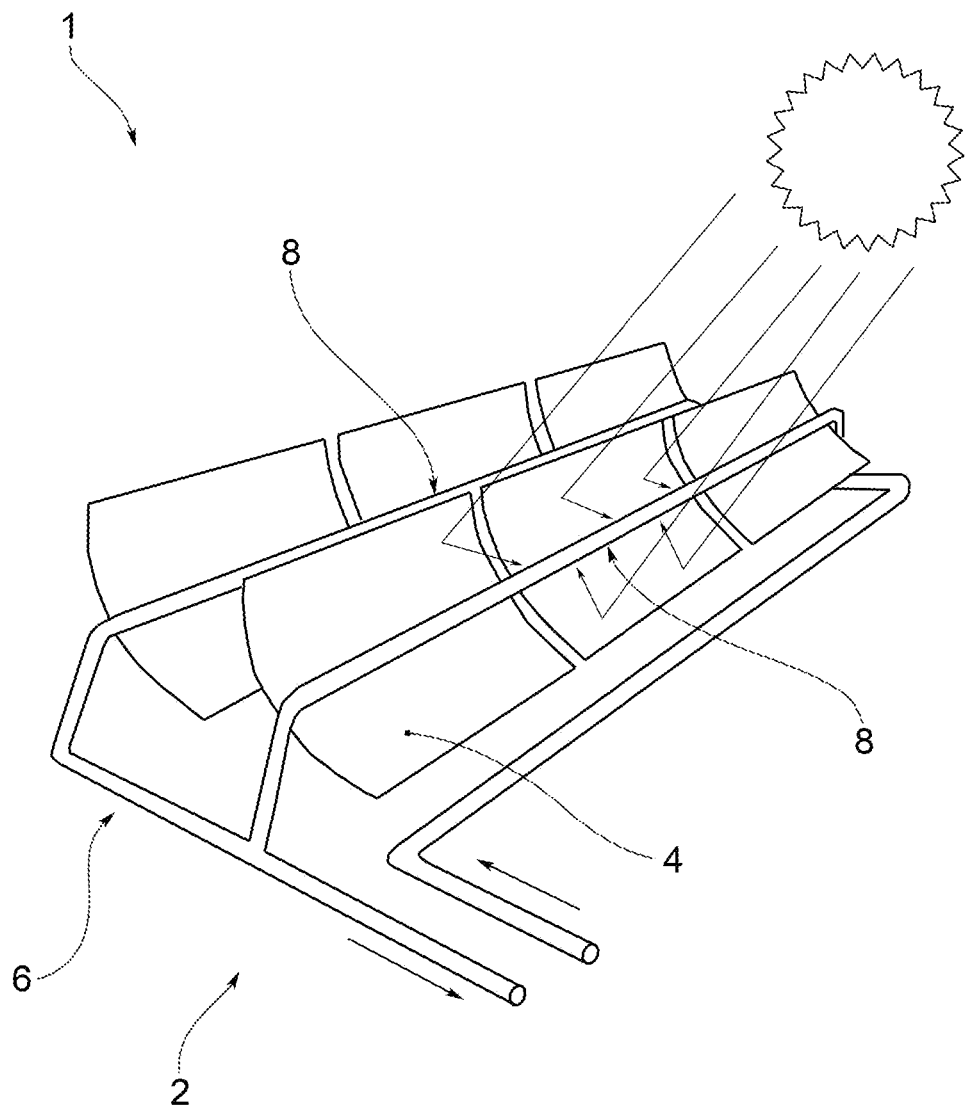
FIG. 1 shows a diagram of a module of a concentrator system for the conversion of solar energy.
Figure 2:
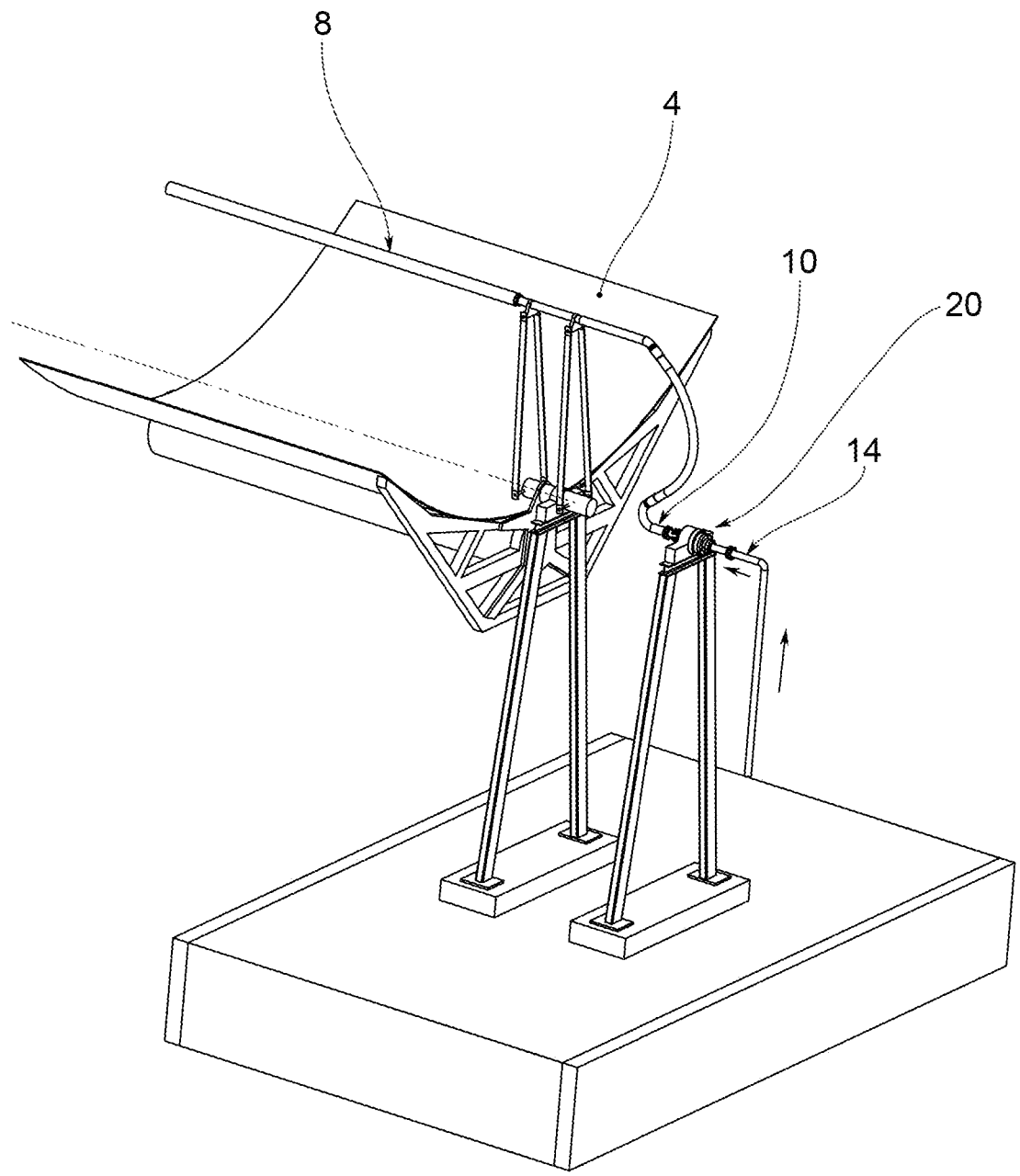
FIG. 2 illustrates a region of the system in FIG. 1.
Figure 3:
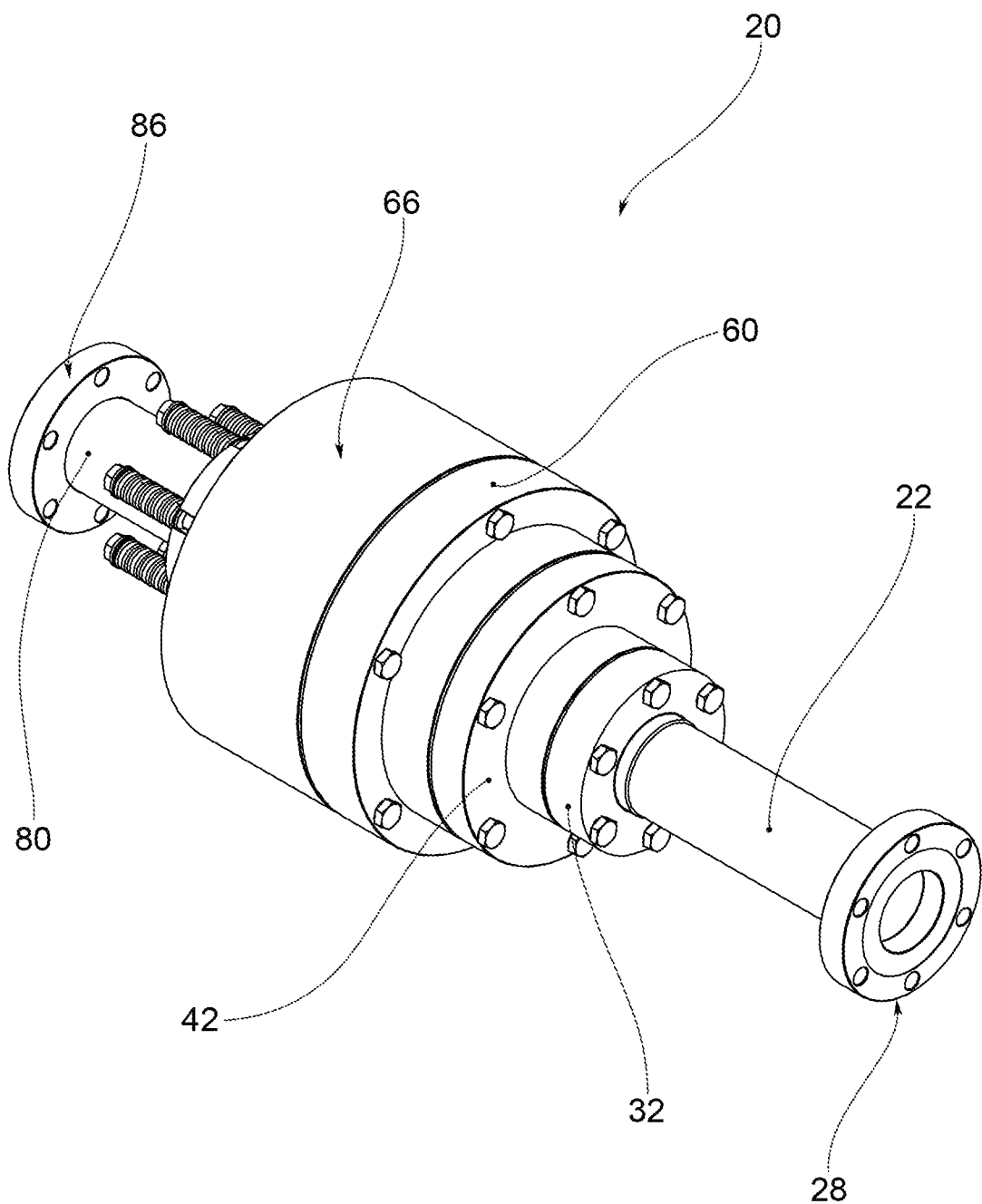
FIG. 3 shows a joint according to an embodiment of the present invention.
Figure 4:
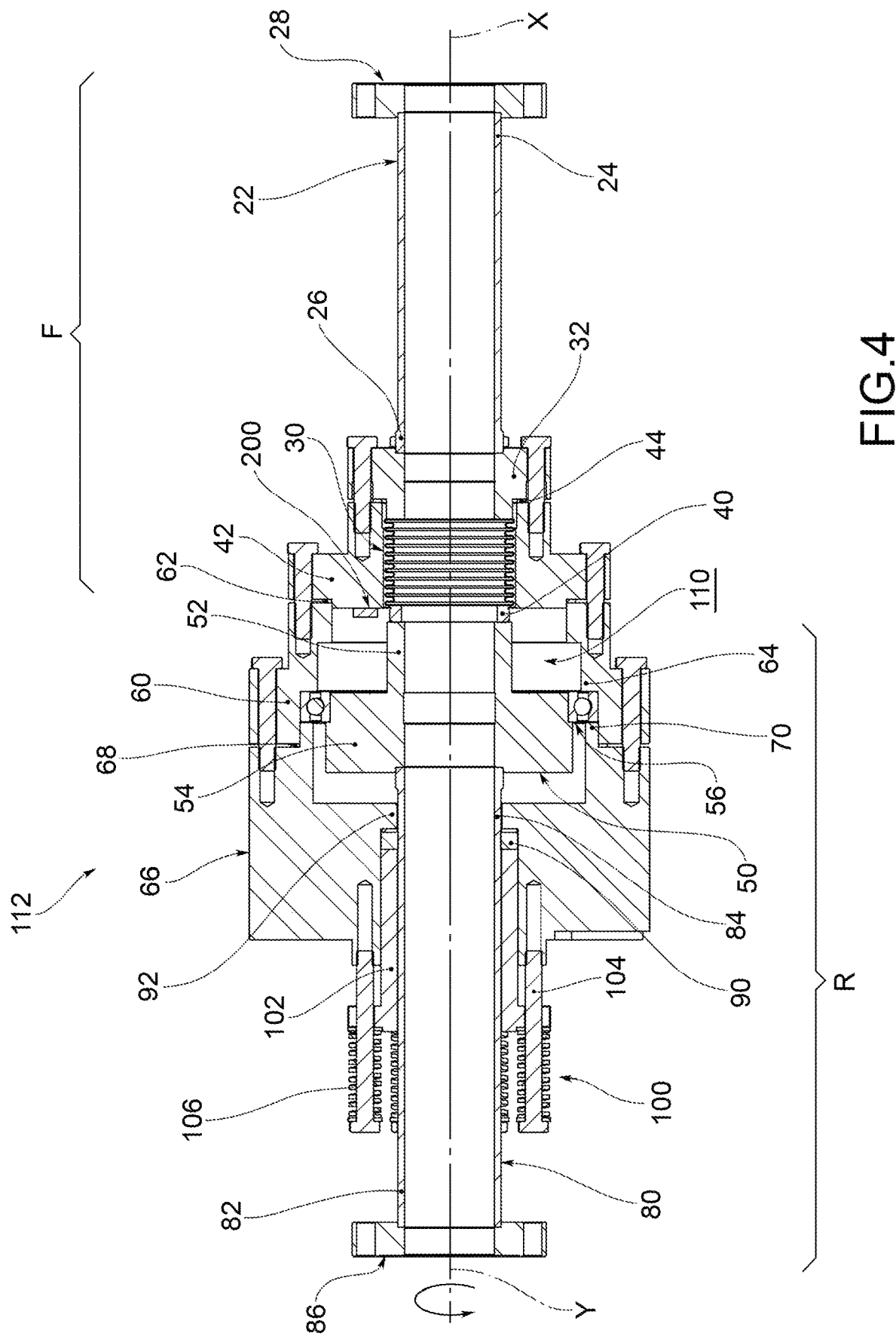
FIG. 4 shows a longitudinal section of the joint of FIG. 3.

With reference to the accompanying figures, a concentrator system for the conversion of solar energy is collectively indicated at 1.

The system 1 comprises a plurality of base modules 2, in jargon called "loops", comprising a series of parabolic mirrors 4 and a local circuit 6 for the transport of a heat transfer fluid, generally a diathermic oil.

Each local circuit 6 comprises a receiver section 8 positioned along the imaginary line identified by the geometric focus of the parabolic surfaces of said mirrors 4, a local inlet section 10 to bring the "cold" fluid to the receiver section 8, and a local outlet section to transport the "hot" fluid originating from the receiver section 8.

The mirrors of the module 2 are rotatable to follow the apparent trajectory of the sun, in order to maximize the solar energy flow on the receiver section 8 of the local circuit 6.

The system 1 further comprises a distribution network for the heat transfer fluid, which unites the modules of said system.

In particular, the network comprises a network inlet section 14 intended to be connected to the local inlet section 10, and a network outlet section intended to be connected to the local outlet section.

During normal operation of the system, the local inlet section 10 and the local outlet section rotate around their own axis, while the network inlet section 14 and the network outlet section are fixed.

A joint 20 is provided for the connection of the local inlet section 10 and the local outlet section with the network inlet section 14 and the network outlet section respectively.

The joint 20 comprises a fixed conduit F which is not subject to rotation during the normal operation of the system.

The fixed conduit F comprises a fixed tubular element 22 having extension along a rectilinear axis X between an outer end 24 and an opposing inner end 26.

Depending on the embodiment, the joint 20 comprises a first connection flange 28 which is fixed to the outer end 24 of the fixed tubular element 22, e.g. by welding. The first connection flange 28 is suitable for connecting the joint 20 to the network inlet section 14 or the network outlet section, by bolting.

Alternatively, the outer end 24 of the fixed tubular element 22 is connected to the network inlet section 14 or the network outlet section by welding.

Preferably, the fixed conduit F further comprises an elastic conduit 30, which is axially deformable elastically and coaxial to the fixed tubular element 22; for example, said elastic conduit 30 is made as a metallic bellows.

Preferably, moreover, the joint 20 comprises a first flange 32, placed between the inner end 26 of the fixed tubular element 22 and the elastic conduit 30, welded thereto. The hole of said first flange 32 is part of the fixed conduit F.

Depending on the variant embodiment, the fixed tubular element and the first flange are made in one piece, e.g. by die-casting.

According to an alternative embodiment (not shown), the elastic conduit is welded directly to the inner end 26 of the fixed tubular element 22.

The joint 20 further comprises a first dynamic seal consisting of a first sealing ring 40, joined to the fixed conduit F.

Preferably, said first sealing ring 40 is joined to the elastic conduit 30, for example welded on the side opposing the fixed tubular element 22, and coaxial thereto.

According to an alternative embodiment (not shown), the first sealing ring 40 is joined directly to the inner end 26 of the fixed tubular element 22, while the elastic conduit is arranged along the fixed conduit F, in a different position.

Preferably, moreover, the joint 20 comprises a second flange 42, which surrounds the elastic conduit 30, fixed, for example by bolting, to the first flange 32, with the interposition of a first static gasket 44.

The joint 20 further comprises a rotatable conduit R, which, in the normal operation of the joint, rotates around its own axis.

The rotatable conduit R comprises a bushing 50, permanently in contact with the first sealing ring 40, with which it is coaxial.

For example, the first sealing ring 40 is permanently pushed by the elastic conduit 30 in contact with said bushing 50 to ensure the relevant seal.

Depending on the embodiment, the bushing 50 comprises a bushing shank 52 in contact with the first sealing ring 40, and a bushing flange 54 that protrudes radially from the bushing shank 52.

The bushing 50 is supported rotatably, such as by a rolling bearing 56; for example, the bearing 56 is mounted to support the bushing flange 54.

The joint 20 further comprises a first casing component 60 that encloses, at least in part, said bushing 50 and is connected, for example by bolting, to the second flange 42, with the interposition of a second static gasket 62.

Preferably, the first casing component 60 supports the ball bearing 56, also obtaining an axial abutment 64 thereto.

The joint 20 further comprises a second casing component 66 that encloses, at least partially, the bushing 50 and is connected to the first casing component 60, for example by means of bolting, with the interposition of a third static gasket 68.

The second casing component 66 preferably forms a further axial abutment 70 for the bearing 56.

Moreover, the rotatable conduit R comprises a rotatable tubular element 80 with extension along a rectilinear axis Y, coinciding with the axis X of the fixed tubular element 22, between an outer end 82 and an opposing inner end 84.

The inner end 84 is joined, preferably by welding, to the bushing 50. According to a variant embodiment, the rotatable tubular element and the bushing are made in one piece, e.g. by die-casting.

The outer end 82, on the other hand, is intended to be connected to the local inlet section 10 or the local outlet section of the distribution network.

According to one embodiment, the joint 20 comprises a second connection flange 86 which is fixed to the outer end 82 of the rotatable conduit 80, e.g. by welding. The second connection flange 86 is suitable for connecting the joint 20 to the local inlet section 10 or to the local outlet section by bolting.

Alternatively, the outer end 82 of the rotatable tubular element 80 is connected to the local inlet section 10 or the local outlet section by welding.

The joint 20 further comprises a second dynamic seal consisting of a second sealing ring 90, which provides a seal between the second casing component 66 (fixed) and the rotatable tubular element 80.

In particular, the second casing component 66 comprises internally an annular outlet wall 92, penetrated by the rotatable tubular element 80. The second sealing ring 90 is permanently compressed axially against the outlet wall 92 of the second casing component 66 and radially against the outer surface of the rotatable tubular element 80 and against the inner surface of the outlet wall 92.

Preferably, for making the second dynamic seal, the joint 20 provides for a stuffing box device 100 that operates permanently on the second sealing ring 90.

For example, said stuffing box device 100 comprises a sleeve 102 coaxial to the rotatable tubular element 80, partially inserted in the second casing component 66, until it comes into contact with the second sealing ring 90.

The stuffing box device 100 further comprises a plurality of screws 104, which slidingly engage the sleeve 102 and screw into the second casing component 66, and a respective plurality of springs 106, each operating between the head of the respective screw 104 and the sleeve 102.

Tightening the screws 104 in the second casing component 66 thus generates an axial load on the sleeve 102 due to the springs 106, such as to press permanently on the second sealing ring 90.

Ultimately, the joint 20 has a chamber 110 inside, in which is found the region of contact between the first sealing ring 40, integral to the fixed conduit F, and the rotatable conduit R, and in particular with the bushing 50.

Said chamber 110 is delimited by an outer casing 112 which, in the illustrated embodiment, comprises the first flange 32, the second flange 42, the first casing component 60 and the second casing component 66.

The chamber 110 is sealed with respect to the outside environment by virtue of the second dynamic gasket that cooperates with the rotatable tubular element 80 that comes out of said outer casing 112, comprising in particular the second sealing ring 90, and at least one static gasket, one for each component of the outer casing 112 (in particular the first 44, the second 62 and the third 68 static gasket).

Once the joint 20 is mounted at the beginning of use, the chamber 110 is at atmospheric pressure.

During the use of the system, a quantity of vapor, however small, escapes from the first dynamic seal between the fixed conduit F and the bushing 50 of the rotatable conduit R, while remaining confined inside the chamber 110.

Advantageously, this reduces the pressure gradient between the fluid that passes through the joint and the chamber, thus reducing the same tendency to leak.

The vapor pressure in the chamber is, however, very low if the joint is working properly, whereby the vapor remains almost confined in the chamber 110, due to the second dynamic seal and the static seals.

According to one embodiment, the joint 20 further comprises a pressure sensor 200 suitable for detecting the existing pressure in the chamber 110.

Said sensor is further suitable for transmitting a pressure signal outside the chamber 110, e.g. via cable or preferably using wireless technology.

Advantageously, the pressure sensor allows the pressure inside the chamber to be monitored; if such pressure should increase significantly, it is very likely that there will be a malfunction of the first dynamic seal, for example, due to wear on the first sealing ring. In such case, the pressure measurement allows for appropriate maintenance work to be carried out.

Moreover, as mentioned above, such systems, even if of medium-small size, occupy very large areas. The presence of the pressure sensor and transmission devices that allow the pressure signal to be transmitted to a remote area, such as to a management control unit of the system, greatly facilitates management of the system and execution of maintenance activities specifically aimed at the joint that indicates the malfunction.

It is apparent that one skilled in the art, in order to meet contingent needs, may make changes to the joint described above, all contained within the scope of protection defined by the following claims.

What is claimed is:

1. A joint for systems for transporting a high temperature heat transfer fluid, the joint comprising:
   a fixed conduit comprising a fixed tubular element having extension along a rectilinear axis between an outer end and an opposing inner end;
   a first sealing ring joined to the fixed conduit;
   a rotatable conduit permanently in contact with the first sealing ring; and
   an outer casing that delimits a chamber from which the fixed conduit and the rotatable conduit extend, wherein a contact region is arranged between the rotatable conduit and the first sealing ring;
   wherein the outer casing is sealingly engaged with the rotatable conduit by a second sealing ring and with the fixed conduit by a static gasket,
   wherein the first sealing ring is permanently pressed in contact with the rotatable conduit,
   wherein the fixed conduit comprises an axially elastically deformable elastic conduit, coaxial to the fixed tubular element and made as a metallic bellows,
   wherein the outer casing comprises an annular outlet wall, through which the rotatable conduit passes, and the second sealing ring is permanently axially compressed against the outlet wall and radially compressed against the rotatable conduit, and
   wherein the joint further comprises a stuffing box device operating on the second sealing ring.

2. The joint of claim 1, wherein the outer casing comprises at least one of casing components or flanges, sealingly connected to each other by static gaskets.

3. The joint of claim 1, wherein the rotatable conduit comprises a bushing placed in contact with the first sealing ring, the bushing being rotatably supported inside the outer casing.

4. The joint of claim 1, further comprising a pressure sensor housed in the chamber and suitable to detect pressure in the chamber and to transmit a pressure signal outside of the outer casing.

5. A concentrator system for converting solar power, the concentrator system comprising:
   a plurality of modules, wherein each module comprises a plurality of rotatable mirrors and a local circuit for a heat transfer fluid, wherein the local circuit comprises a receiver section, a local inlet section, and a local outlet section;
   a distribution network for fluidically connecting the plurality of modules, comprising a network inlet section connected to the local inlet section, and a network outlet section connected to the local outlet section; and
   a plurality of joints, wherein each joint comprises:
      a fixed conduit comprising a fixed tubular element having extension along a rectilinear axis between an outer end and an opposing inner end;
      a first sealing ring joined to the fixed conduit;
      a rotatable conduit permanently in contact with the first sealing ring; and
      an outer casing that delimits a chamber from which the fixed conduit and the rotatable conduit extend, wherein a contact region is arranged between the rotatable conduit and the first sealing ring;
      wherein the outer casing is sealingly engaged with the rotatable conduit by a second sealing ring and with the fixed conduit by a static gasket,
      wherein the first sealing ring is permanently pressed in contact with the rotatable conduit,
   wherein the fixed conduit comprises an axially elastically deformable elastic conduit, coaxial to the fixed tubular element and made as a metallic bellows,
   wherein the outer casing comprises an annular outlet wall, through which the rotatable conduit passes, and the second sealing ring is permanently axially compressed against the outlet wall and radially compressed against the rotatable conduit, and
   wherein the joint further comprises a stuffing box device operating on the second sealing ring,
   each joint connecting the local inlet section or the local outlet section of each module with respectively the network inlet section or the network outlet section of the distribution network.

6. The concentrator system of claim 5,
   wherein each joint further comprises a pressure sensor housed in said chamber and suitable to detect pressure in said chamber and to transmit a pressure signal outside of the outer casing, and
   wherein the concentrator system further comprises:
      transmission devices for remote transmission of a pressure signal from each joint; and
      a management unit for receiving and processing pressure signals.

* * * * *